(No Model.)

H. ELMBLAD.
BELT FASTENER.

No. 384,434. Patented June 12, 1888.

Witnesses:
J. B. Halpenny.
Geo. W. Underwood.

Inventor:
Hjalmar Elmblad.

UNITED STATES PATENT OFFICE.

HJALMAR ELMBLAD, OF CHICAGO, ILLINOIS.

BELT-FASTENER.

SPECIFICATION forming part of Letters Patent No. 384,434, dated June 12, 1888.

Application filed September 29, 1887. Serial No. 251,016. (No model.)

*To all whom it may concern:*

Be it known that I, HJALMAR ELMBLAD, of Chicago, in the county of Cook and State of Illinois, have invented certain new and useful Improvements in Belt-Fasteners, of which the following, in connection with the accompanying drawings, is a specification.

My invention relates to improved means for fastening flat belts, which I will herein endeavor to fully describe, and set forth in my claim.

Figure 1:
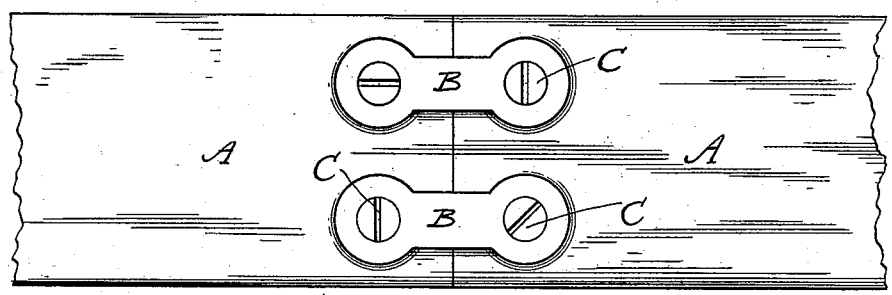
Figure 2:
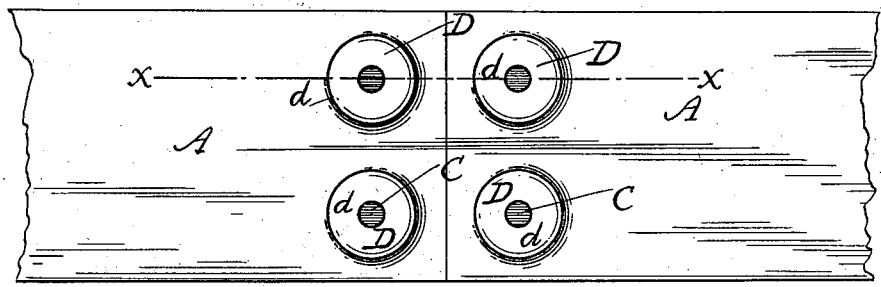
Figure 3:
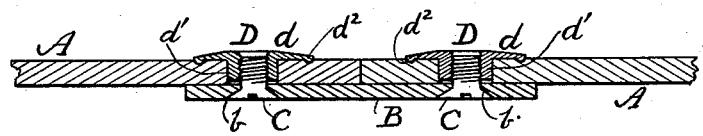
Figure 4:
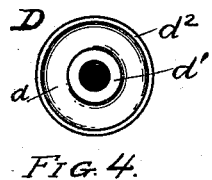

In the drawings, Figure 1 is a top view of portions of a belt connected together with my improved fastener. Fig. 2 is a like view of the opposite side of the belt. Fig. 3 is a longitudinal section, enlarged, taken on the line $x$ $x$ of Fig. 2; and Fig. 4 is an end view of one of the nuts.

Like letters of reference indicate like parts.

A is a belt of the kind usually used in transmitting power in machinery.

B B are coupling-plates or connecting bars made of thin metal and having holes $b$ $b$, preferably countersunk, as shown.

C C are small screw-bolts passing through the holes $b$ $b$ and entering nuts D D, having shanks inserted in the belt. The extreme length of one of the screw-bolts C is slightly less than the combined thicknesses of the coupling-plate B and nut D. The screw thus does not project through the nut D. Each nut D has a thin, broad, and flat head, $d$, having the screw-threaded extension or shank $d'$, which is inserted in hole punched in belt. I prefer to make the head of the nut annular in form, as shown, with a small ridge or projection, $d^2$, on its inner side.

To apply my fastener, I first mark off and punch suitable holes in one end of the belt A. I then insert nuts D D in the holes, the shanks of the nuts being of a size to fit neatly and tightly in the holes. On the opposite or outside of belt I place the coupling-plates B B, securing the ends of the plates to the belt by means of the screw-bolts C C and tightening the screw-bolts by means of a screw-driver. I then bring both ends of the belt together, and in a like manner fasten the remaining end of belt to the plates B B. I use, according to the width of a belt, any suitable number of coupling-plates. For instance, on a small belt one inch in width one plate would answer the purpose, while on a four-inch belt three of the plates might be necessary. By means of the shank $d'$ on the nut D, I am enabled to screw the parts very securely together without having the screw project. The broad head $d$ gives ample hold on the belt, and the projection or ridge $d^2$ gives additional adherence to the belt, while the flatness of the head offers no resistance to pulleys. The shank $d'$ also completely fills the hole in belt and prevents the screw from tearing fibers of belt, thus giving a larger and better wearing-surface than a screw or lacing would.

The fastener may be taken off the belt at any time by unscrewing the screw-bolts, and then may be readily used over again.

It will be seen that my improvement is easily manufactured, can be applied simply, and enables the belt to be held together in a very tenacious manner.

I am aware that belt-fasteners have been made provided with plates or bars having projecting screw-sockets, as shown in Letters Patent No. 82,227, granted to T. Kennedy September 15, 1868, and No. 143,474, granted to P. Subit October 7, 1873; but I am not aware that such a useful construction and combination of parts as shown by me has ever been used prior to my invention thereof.

What I claim as new, and desire to secure by Letters Patent, is—

In a belt-fastener, the coupling or connecting bar B, having holes $b$ $b$, in combination with screw-bolts C C, and the broad flat-headed nuts D D, having screw-threaded extensions or shanks $d'$ $d'$, substantially as shown, and for the purposes set forth.

HJALMAR ELMBLAD.

Witnesses:
J. B. HALPENNY,
M. BYRON RICH.